March 23, 1965 E. C. BOPF 3,174,267
COTTON HARVESTER

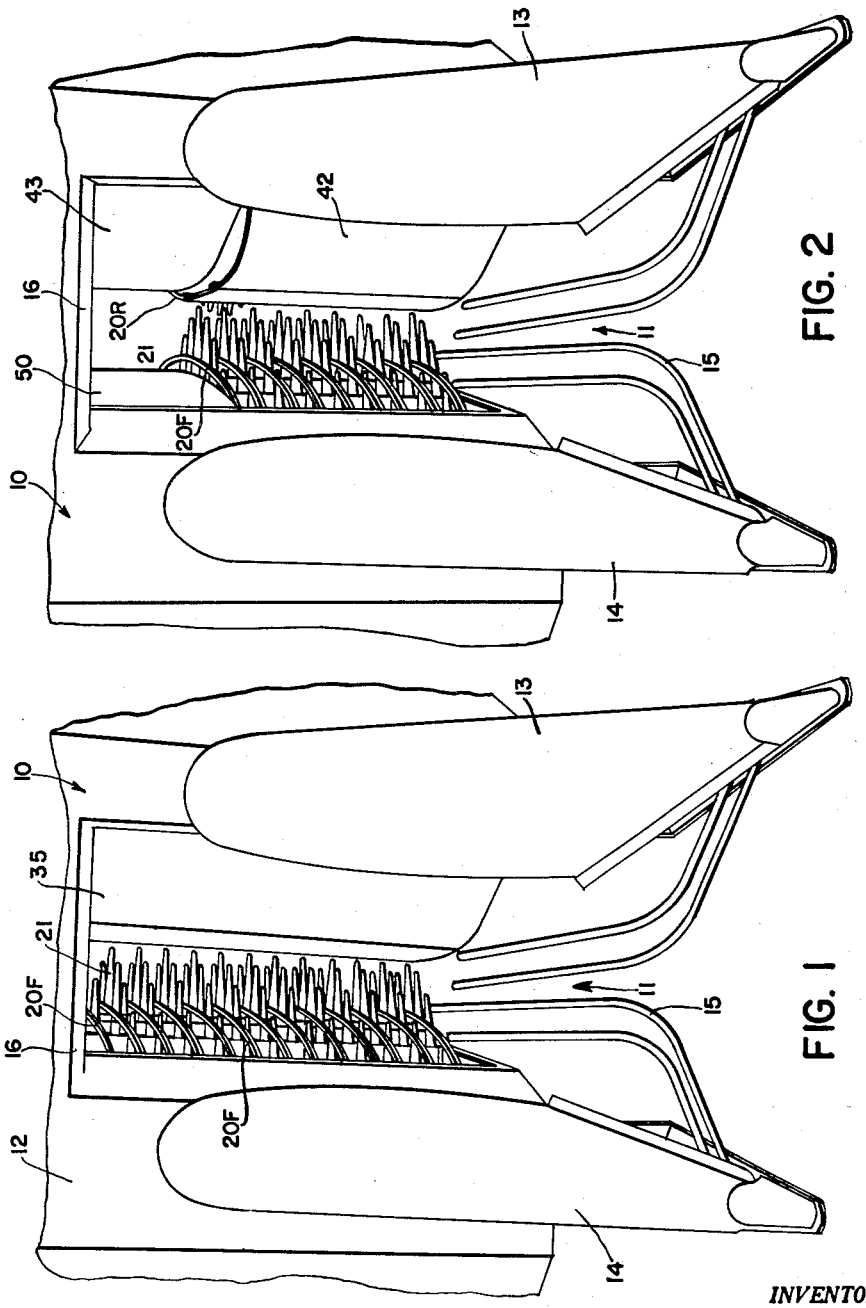

Filed March 5, 1962 2 Sheets-Sheet 2

INVENTOR.
E. C. BOPF
BY William A. Murray
ATTORNEY

United States Patent Office 3,174,267
Patented Mar. 23, 1965

3,174,267
COTTON HARVESTER
Edward C. Bopf, Des Moines, Iowa, assignor to Deere & Company, Moline, Ill., a corporation of Delaware
Filed Mar. 5, 1962, Ser. No. 177,550
9 Claims. (Cl. 56—44)

This invention relates to a cotton harvester and more particularly to an improvement which features a plant passage for a cotton harvester effective to permit passage of the cotton plants without harvesting the upper cotton bolls of the plants.

It is a primary object of the present invention to provide a housing structure defining a plant receiving passage which may have continuous upright walls on opposite sides of the passage with upper section or portions of the walls offset laterally from the plant passage.

In the normal harvesting of cotton, it is often desirable to pick the ripe cotton bolls at the lower portion of the cotton plants and to leave the greener or upper bolls on the cotton plant. Normally the cotton plants have their riper cotton bolls initially at the lower portions thereof while the upper portions retain the green or hard cotton bolls. However, if a cotton plant is only partially ripe and passes through a cotton harvester, often the upper or green cotton bolls are dislodged from the cotton plant. If not at a sufficiently mature stage, the cotton boll is lost once it is detached from the cotton plant.

In the conventional type cotton harvester there is provided a housing structure defining a fore-and-aft extending plant passage with wall structure on opposite sides of the plant passage. Adjacent the wall structure and internally disposed relative to the housing structure is a pair of upright drums having laterally extending spindles extending into the plant passage which upon rotation of the spindles causes the cotton bolls to snag or to be harvested. The conventional cotton harvester has sufficient spindles to pick the ripe cotton from the entire height of the cotton plant.

With the above in mind, it is also the primary object of the present invention to provide in combination with the picker housing an upright spindle carrying drum composed of upright columns having spindles spaced vertically apart. If desirable, the upper spindles may be removed from the columns. There is provided a plate structure laterally offset from the wall structure on the spindle side of the passage to fit closely adjacent to the column when the spindles are removed.

It is also an object of the present invention to provide with the above an upper panel or plate on the opposite side of the plant passage laterally offset from the lower section opposite to the spindles projecting into the plant passage. Consequently the entire harvester may be adjusted so that the plant passage is substantially T-shaped with the wider upper portion of the T-shaped passage having no spindles projecting into the passage.

Other objects and advantages of the present invention will become apparent to those skilled in the art as the nature of the invention is better understood from the following description and as shown in the accompanying drawings.

FIG. 1 is a front perspective view looking into a cotton harvester.

FIG. 2 is a front perspective view, similar to FIG. 1 looking into the front of a cotton harvester incorporating the principles of the present invention.

Figure 4:
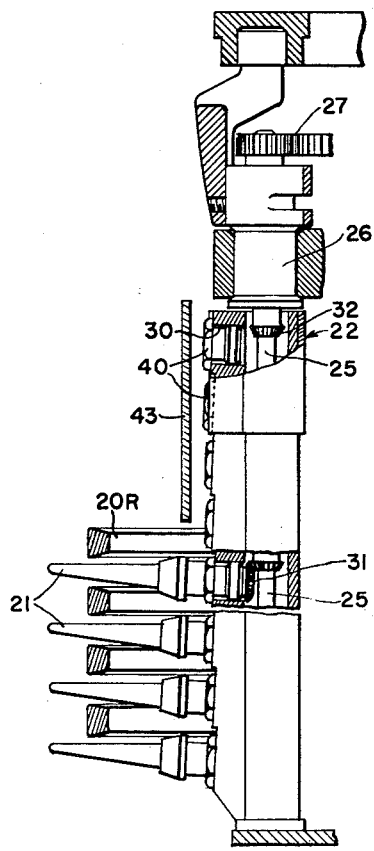
FIG. 4 is a sectional view on a larger scale taken substantially along the line 4—4 of FIG. 3.

The cotton harvester shown generally in FIG. 1 may be of the type described in detail in U.S. Patent 2,672,001 issued to Mr. E. C. Bopf et al. March 15, 1954. The harvesting unit is normally composed of a housing structure, here indicated in its entirety by the reference numeral 10, formed to define a fore-and-aft extending plant passage 11 through which the cotton plants move as the harvester moves forwardly over the field. The housing structure 10 includes a forwardly disposed upright wall 12 having leg portions depending on opposite sides of the passage. Plant lifters 13, 14 extend forwardly from the front wall 12 in position on opposite sides of the passage 11 to lift fallen plants and to guide plants into the passage 11. Further provided for purposes of guiding and otherwise aiding movement of the plant passage 11 are spring fingers 15 connected at their forward ends to stock lifters 13, 14 and trailing rearwardly into the passage 11. The passage is closed at the top by cross housing, indicated only partially at 16.

Internally of the housing structure 10 and positioned on opposite sides of and in the front and rear portions of the plant passage 11 is a series of vertically spaced and laterally disposed grid bars 20F, 20R forming slots through which a series of laterally moving cotton picking spindles 21 move into the plant passage 11 for the purpose of picking the cotton bolls from the cotton. The spindles 21 are mounted on upright columnar members 22. The columnar members 22 are spaced angularly around upright harvesting drums indicated in their entireties by reference numerals 23, 24 and shown schematically in FIG. 3. Each columnar member 22 is generally hollow and has contained therein a spindle drive shaft 25 extending the entire height of the column 22 and through the upper end thereof to be journaled at 26 in a main support for the columnar member. The shaft 25 is driven at its upper end by spur gears 27. The exact type of drive mechanism is not important for the present disclosure, but if information relative to such is desired, a complete disclosure is provided in U.S. Patent 2,723,520 issued to Mr. W. L. Hubbard, November 15, 1955.

Each column 22 operates as a spindle support and has vertically spaced spindle receiving openings 30 therein tapped to receive the drive end of the spindles 21. The spindles 21 are of conventional type having their picking or external ends barbed to snag the cotton bolls and having on their inner ends spur gears 31 in driving engagement with bevel gears 32 fixed to the spindle drive shaft 25. As is conventional, the drums 23, 24 are driven about their upright axes as are the spindle drive shafts 25. The drive shafts 25 create rotation in the spindles 21 through the gears 31, 32.

In the conventional type of cotton harvester, as shown in FIG. 1, there are provided spindles 21 the entire height of the column 22. On the opposite side of the passage 11 there is provided a pressure plate, such as at 35 having spring loaded fingers, as shown at 36 in FIG. 3, engaging the backside thereof to gently bias the plate toward the spindles 21. Upon plants passing through the passage, there is a tendency for the plate 35 to yield laterally outwardly. However, the pressure of the springs 36 on the plate tends to force the plants into engagement with the spindles 21. Should a large obstruction pass through the plant passage 11, the pressure plate 35 yields considerably so as to permit the obstruction to pass.

Figure 3:
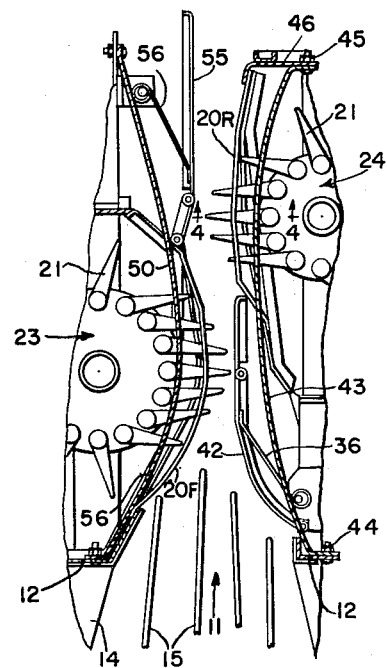
FIG. 3 is a plan view with parts broken away of a portion of the cotton harvester and shown somewhat in schematic form.

It is often desirable to pick only the lower of the cotton bolls on the cotton plants. Consequently, it is desirable to remove the upper spindles 21 from their respective column member 22, such as is shown in FIGS. 2, 3, and 4. In this design, the tapped openings 30 are provided with plug elements 40. The wall structure disposed opposite the drum 23 is composed of a lower section 42 biased by the springs 36 in conventional manner to maintain pressure of the plant against the spindles 21 on the drum 23. The wall structure is also provided with an upper arcuate shaped upright section 43 that may be bolted, as at 44, 45 or otherwise detachably connected to the housing structure 10. The upper section 43 is offset laterally from the lower section 42 and extends from the front wall 12 to a rear wall 46 of the picker housing. The upright section 43 lies closely adjacent the innermost columns 22 of the drum 24. The spindles 21 of the drums 23, 24 extend through grid bars 20F, 20R respectively. As may be seen, the plate 43 is also offset laterally outwardly from the wall structure formed by the grid bars 20R.

On the side of the passage the drum 23 is positioned, an upper plate 50 is detachably fixed to the front wall 12 of the housing structure. The plate 50 is the height, in the particular instance shown, of approximately three of the spindles 21 and is also arcuately shaped with a portion thereof lying closely adjacent the innermost columns 22 of the drum 23. The upper portion 50 is also laterally offset from the grid bars 20F which form the lower wall structure on that side of the passage 11. At the rear of the passage 11 is provided a second set of pressure plates 55 extending to a height only to the lower edge of the plate 50. The plate 55 is engaged on its backside by spring loaded fingers 56 to restrain it against movement away from the passage 11. The rear portion of the plate 50 is also offset laterally and outwardly as respects the rear pressure plate 55.

Reviewing the entire wall structures defining the passage 11, it should be noted in FIGS. 2–4 the upper wall section 43 is laterally offset from the lower wall section as defined by the pressure plate section 42 at the front of the passage 11 and by the grid bars 20R at the rear of the passage 11. Similarly on the opposite side of the passage the upper wall section 50 is laterally and outwardly offset as respects the passage 11 from the lower wall sections as defined by the grid bars 20F at the front of the passage and by the pressure plate structure 55 at the rear of the passage. In this respect, it should be recognized that the plant passage has substantially a T-shaped cross section with the large bar portion or area of the T having no aggressive picking means and the narrow stem section of the T having the picking spindles 21 extending therein.

In operation the form of the invention as shown in FIGS. 2–4 provides for the lower portion of the plants to be picked whereas the upper portion of the plants pass through the upper tunnel or bar-section of the T-shaped plant passage. Should it be desired to provide the full complement of picking spindles, it is necessary only to replace the plugs 40 with the spindles in the column 2 and to replace the two section wall structure with the single wall structures as shown in FIG. 1.

While only one form of the invention has been shown, it should be recognized that other forms and variations will occur to those skilled in the art. Therefore, it should be understood that while the present disclosure has been shown and described in detail for purposes of completely and concisely illustrating the principles of the invention, it is not the intention to limit or narrow the invention beyond the broad concepts set forth in the appended claims.

What is claimed is:

1. In a cotton harvester, the combination of: housing structure including upright opposed side wall structures spaced apart to define a fore-and-aft extending plant passage and composed of upper and lower vertical wall sections with the upper sections thereof being laterally and outwardly offset relative to the passage from the lower sections whereby the plant passage is generally T-shaped in cross section; means removably mounting the upper of said sections to the housing structure; harvesting mechanisms mounted in the housing structure adjacent each of the side wall structures and composed of upright spindle supporting columns with vertically spaced spindle-receiving openings therein with upper portions thereof adjacent the upper sections of the side wall structures and lower portions thereof adjacent the lower sections of the side wall structure; and laterally extending cotton picking spindles mounted in the spindle receiving openings of the lower portions of the columns adapted to extend into the plant passage for harvesting cotton from plants within the passage.

2. In a cotton harvester, the combination of: housing structure including upright opposed side wall structures spaced apart to define a fore-and-aft extending plant passage and composed of upper and lower vertical wall sections with the upper sections thereof being laterally and outwardly offset relative to the passage from the lower sections whereby the plant passage is generally T-shaped in cross section; means removably mounting the upper of said sections to the housing structure; harvesting mechanisms mounted in the housing structure adjacent each of the side wall structures and composed of upright spindle supporting columns with vertically spaced spindle-receiving openings therein with upper portions thereof adjacent the upper sections of the side wall structures and lower portions thereof adjacent the lower sections of the side wall structures; laterally extending cotton picking spindles mounted in the spindle receiving openings on the lower portions of the columns adapted to extend into the plant passage for harvesting cotton from plants within the passage; and elements removably mounted on the supporting columns closing the spindle receiving openings in the upper portions of the columns.

3. In a cotton harvester, housing structure including upright opposed side wall structures spaced apart to define a fore-and-aft extending plant passage closed at its upper end by a panel extending across the passage and composed of upper and lower vertical wall sections with the upper sections thereof being laterally and outwardly offset relative to the passage from the lower sections and defining an upper non-picking channel adapted to pass the upper portions of the plants whereby the plant passage is generally T-shaped in cross section; and cotton picking mechanism supported in the housing structure including laterally extending picking spindles projecting through a lower wall section and into the passage.

4. In a cotton harvester, housing structure including vertically disposed and opposed side wall structures spaced apart to define a fore-and-aft extending plant passage and composed of upper and lower vertical wall sections with the upper sections thereof being laterally and outwardly offset relative to the passage from the lower sections; and overhead panel extending across the passage between the upper wall sections for closing the upper end of the passage; and cotton picking mechanism supported in the housing structure including laterally extending picking spindles projecting through a lower wall section and into the passage.

5. The invention defined in claim 4 in which the picking mechanism is rotatably mounted in the housing structure to one side of the passage and the laterally extending picking spindles are vertically spaced, the latter defining the effective harvesting height of the harvester; and the lower section of the side wall structure on that side of the passage is disposed adjacent the picking mechanism and is substantially equal to the aforesaid effective height, and is composed of fore-and-aft extending bars spaced vertically apart to permit ingress and egress of the spindles into and out of the passage.

6. The invention defined in claim 8 in which the upper section of the wall structure on the aforesaid side of the passage has a smooth and uninterrupted surface facing the passage.

7. The invention defined in claim 8 in which the upper and lower sections of the wall structure on the opposite side of the passage are smooth and continuous plates.

8. In a cotton harvester, housing structure including vertically disposed and opposed side wall structures spaced apart to define a fore-and-aft extending plant passage and composed of upper and lower vertical wall sections with the upper sections thereof being laterally and outwardly offset relative to the passage from the lower sections; upright rotatable harvesting mechanism mounted in the housing structure to one side of the passage with vertically spaced and laterally extending picking spindles, the latter defining the effective harvesting height of the harvester, the lower section of the side wall structure on that side of the passage being disposed adjacent the harvesting mechanism and being substantially equal to the aforesaid effective height, and being composed of fore-and-aft extending bars spaced vertically apart to permit ingress and egress of the spindles into and out of the passage.

9. The invention defined in claim 8 further characterized by the housing structure including a laterally disposed overhead panel extending across the passage between the upper wall sections for closing the upper end of the passage.

References Cited by the Examiner
UNITED STATES PATENTS

| | | | |
|---|---|---|---|
| 212,740 | 2/79 | Pirtle | 56—48 |
| 371,372 | 10/87 | Savage. | |
| 217,409 | 3/94 | Lispenard | 56—48 |
| 2,616,353 | 11/52 | Thomann | 56—11 X |
| 2,648,941 | 8/53 | Hintz | 56—119 X |
| 2,803,938 | 8/57 | Thomann | 56—41 |

T. GRAHAM CRAVER, *Primary Examiner.*

RUSSELL R. KINSEY, *Examiner.*